Figure 1:
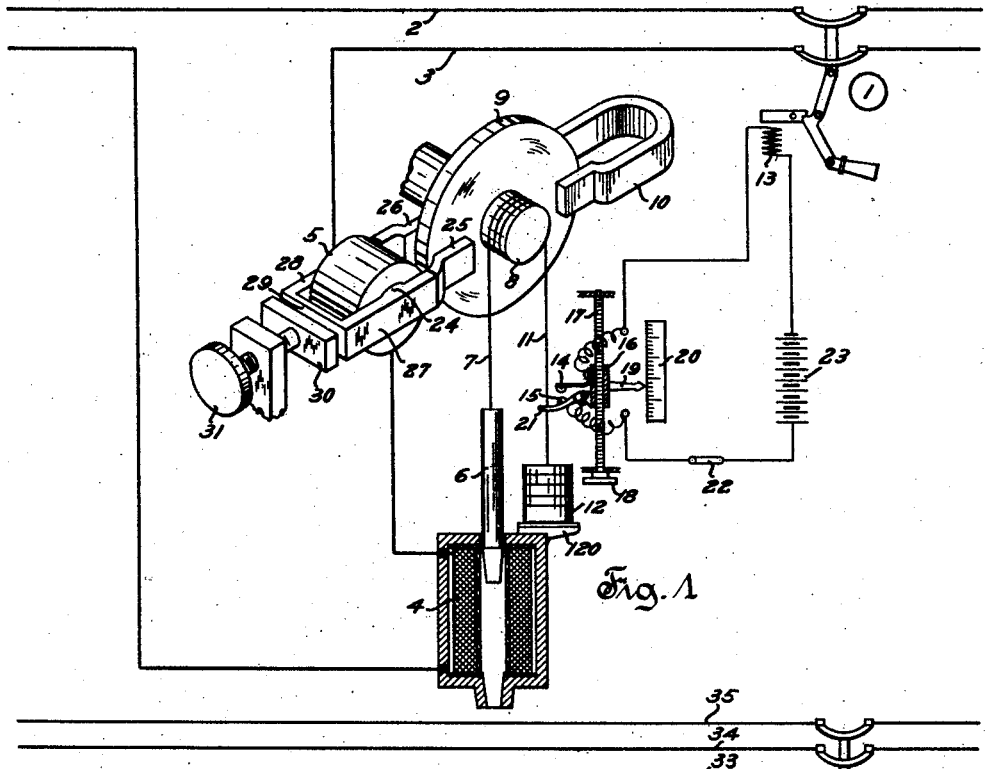

G. M. ALBRECHT.
ELECTROMOTIVE DEVICE.
APPLICATION FILED MAY 27, 1918.

1,344,196.

Patented June 22, 1920.

Inventor
G. M. Albrecht
by
Attorney

UNITED STATES PATENT OFFICE.

GEORGE M. ALBRECHT, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

ELECTROMOTIVE DEVICE.

1,344,196.     Specification of Letters Patent.    Patented June 22, 1920.

Application filed May 27, 1918. Serial No. 236,949.

*To all whom it may concern:*

Be it known that I, GEORGE M. ALBRECHT, a citizen of the United States, residing at Milwaukee, in the county of Milwaukee and State of Wisconsin, have invented a certain new and useful Improvement in Electromotive Devices, of which the following is a specification.

This invention relates to electromotive devices and may be applied, for example, for driving the movable element of relay devices and more particularly such devices used for closing the trip coil circuit of a circuit breaker under abnormal conditions as overload for example.

It is most convenient to refer to the device in connection with one of its uses. In systems of distribution supplying translating devices, overloads frequently occur but these are usually dangerous only if they continue for a predetermined time. It is thus not desirable to interrupt the current-supply to a translating device or feeder as soon as there is excessive overload as the overload may be only momentary and thus no damage will be caused. It is furthermore desirable that the circuit be interrupted after the occurrence of an abnormal condition in times inversely proportional to the abnormality of the conditions but when the latter exceeds a given value it is further desirable, in order that all of the relays on a system do not operate at once, to obtain actuation in a constant time irrespective of the abnormality of the condition. Each relay can thus be set for a different constant time and they will thus be selective in their action, only the circuits nearest the overload or short circuit being opened. It is obvious that in order to secure results of this character, the controlling characteristics of the motive device cannot be a linear function of the abnormal condition.

An object of this invention is the provision of an electromotive device for use in systems of the kind mentioned, or in other relations, which will have varying control characteristics.

Another object is the provision of means for attaining varying control characteristics equally applicable to direct current and alternating current.

Another object is the provision of a device which will execute its effective movement after the occurrence of an abnormal condition in times inversely proportional to the abnormality of the condition up to a certain predetermined condition and above that condition to execute its effective movement in a substantially predetermined constant time.

Another object is the provision of devices of the above noted character in which variable control is obtained without the use of movable parts or contacts. Other objects will appear hereinafter as the description of the invention proceeds.

The novel features of the invention will be apparent from this specification and the accompanying drawings which form a part thereof and will be particularly pointed out in the claims.

In Figure 1, a diagrammatic view partly in perspective, the invention is shown as it may be applied in a relay of the direct current type.

Figure 2:
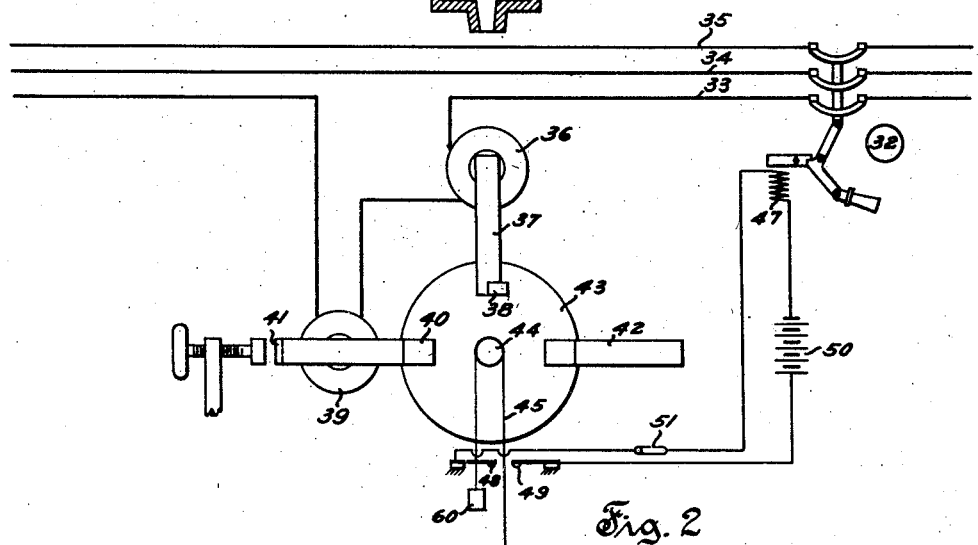

In Fig. 2, a diagrammatic view, the invention is shown as it may be applied in a relay of alternating current type.

In Fig. 1 a circuit breaker 1 is shown in the conductors 2, 3 of a main circuit which supplies a translating device (not shown). In one of these conductors is shown an actuating coil 4 and in series therewith a control coil 5. The actuating coil 4 is provided with an actuating core 6 attached to a cord 7 which is wound around a drum 8 operatively connected to an electrically conductive disk 9. Movement of this disk is retarded by means of a permanent magnet 10 or other magnet supplying a substantially constant flux. The other end 11 of the cord has weights 12 attached thereto. A stop 120 is provided for the weights 12 so as to place actuating core 6 in its initial coöperative relation to actuating coil 4.

The circuit breaker 1 is provided with a trip-coil 13, the circuit of which may be closed by the contacts 14, 15. The contact 14 is supported by an adjustable carrier 16 which is movable up and down by means of the screw 17 operated by the thumb wheel 18. The indicator 19 is provided for the carrier 16 and in conjunction with the scale 20, which latter may be calibrated in seconds, serves to indicate the time-setting of the relay. The contact 15 is mounted on an arm 21 pivoted to the carrier 16. Any source of current 23 is provided for the trip-coil circuit.

The control coil 5 is wound on a core 24 which core bridges the poles 25, 26, of magnetic material, which poles are disposed so that flux passing between the same will pass through some portion of the disk 9. These poles have rearward extensions 27, 28 which are bridged by what will be termed a saturation piece 29.

The operation of the device shown in Fig. 1 is as follows: When the current in the main circuit reaches a predetermined value sufficient to draw the core 6 into coil 4, the disk 9 will be rotated and it will be retarded by the permanent magnet 10. After a predetermined time the weights 12 will reach the arm 21 and the circuit of the trip-coil will be closed thereby interrupting the main circuit after which the parts return to normal position as shown in Fig. 1. This time will depend upon the adjustment of the carrier 16 as to its vertical location. Had the overload been greater the core 6 would have exerted a greater torque on the disk 9 and consequently the weights 12 would have been raised through the same space in a less time.

Up to a predetermined overload the control coil 5 and its associated parts has no effect whatever upon the disk 9. This is for the reason that with a given current flow in the coil 5 practically all of the flux is shunted away from the gap between the pole pieces 25, 26 by means of the saturation piece 29, which latter piece is, however, not saturated for the lower degrees of overload. If however, an overload occurs which will produce sufficient flux to saturate the piece 29, flux will begin to appear between the pole pieces 25, 26, thus exerting a retarding effect on the disk 9 additional to that exerted by permanent magnet 10. It is clear that this additional retarding effect will be proportional to the excess amount of overload. For such overloads therefore the weights 12 and all parts moving therewith will no longer execute their effective movement in times inversely proportional to the overload but in a substantially constant time since a force is now being exerted on the disk 9 proportional to and in opposition to any increase of force produced upon the core 6 by coil 4.

It may be noted that the variation in controlling characteristics is secured in the device purely by a change in the total distribution of flux in the controlling device without the use of movable parts and dependent solely on the abnormality of the condition to be controlled.

If desired, an auxiliary saturated piece 30 adjustable by means of a screw 31 may be provided. Adjustment of the piece 30 will change the degree of overload or other abnormal condition at which flux will begin to appear at the gap between the pole pieces 25, 26, since the piece 30 will obviously vary the amount of shunting of the said gap.

The actuating device comprising the core 6 and the coil 4 is preferably of such a form that for any given value of current flow through the coil, the pull on the core will be uniform throughout the stroke. The specific structure whereby this result is obtained is not material as far as the invention of the present case is concerned.

In Fig. 2 is shown a circuit breaker 32 for interrupting the three-phase lines 33, 34, 35. In one of these lines 33 an actuating coil 36 may be inserted, which coil is wound on a U-shaped core, the top leg 37 of which is visible in the drawing. A shading coil 38 is provided, which in conjunction with the poles of the U-shaped core, operates in the well known manner upon the conducting disk 43 to produce a torque thereon.

A control coil 39 is provided in series with the coil 36 and this control coil and the core and pole structure with which it is associated corresponds in every particular to the control coil 5 and its associated core and pole parts. A saturation piece 41 corresponding to the saturation piece 29 of Fig. 1 is provided. A permanent magnet 42 corresponds to the magnet 10 of Fig. 1. The conducting disk has associated therewith a drum 44 adapted to wind up a cord 45 having weights 46 attached thereto. A stop 46o is provided for weights 46. A counterweight 60 is provided to keep taut cord 45. The circuit breaker 32 is provided with a trip-coil 47 the circuit of which may be closed at the contacts 48, 49, by the weights 46. The trip-coil may be provided with any source of current 50.

The operation of the device shown in Fig. 2 with varying degrees of overload is precisely the same as that of the device shown in Fig. 1, excepting that the disk 43 is actuated by the shading coil. The contacts 48, 49, may be made adjustable in the manner similar to that shown for the contacts 14, 15, in Fig. 1.

Switches, 22, Fig. 1 and 51, Fig. 2, may be provided if desired to open the trip-coil circuit manually in case adjustment of the closing contacts is desired.

The particular manner in which the trip-coil circuit contacts are actuated by the conducting disk is immaterial, the showing being merely illustrative.

It should be understood that it is not desired that the invention claimed be limited to the exact details of construction shown and described, for obvious modifications will occur to a person skilled in the art.

I claim:

1. In combination with an electrical conductor, an electro-responsive actuating device in circuit with said conductor, a conducting disk driven by said electro-responsive device, a substantially constant-flux-magnet for retarding said disk, an electromagnet in series with said electro-responsive device adapted to produce a field for retarding said disk, a magnetic shunt for said electro-magnet preventing the appearance of said field, but becoming saturated at a predetermined current in said conductor thereby permitting a field to appear and become effective.

2. In combination with an electrical conductor, an electro-responsive actuating device carrying current proportional to said conductor, and means for magnetically retarding said device, comprising means responsive to current in said conductor for increasing the retardation of said device dependent upon the distribution of magnetic flux in said retarding means.

3. In combination with an electrical conductor, a direct current electro-responsive actuating device adapted to carry current proportional to said conductor, and means for magnetically retarding said device comprising means responsive to direct current of a predetermined value in said conductor for increasing the retardation of said device dependent upon the distribution of magnetic flux in said retarding means.

4. In combination with an electrical conductor, an electro-responsive actuating device adapted to carry current proportional to said conductor, means for retarding said device, magnetic means dependent upon the distribution of magnetic flux for increasing the retardation of said device substantially in proportion to the current in said conductor, and means for causing distribution of flux to be such as to inhibit the action of said retardation increasing means when the current is of predetermined values.

5. In combination with an electrical conductor, an electro-responsive actuating device adapted to carry current substantially proportional to current in said conductor, means for retarding said device, additional means for retarding said device operative upon a change in distribution of flux within said additional means caused by current flow of a predetermined value in said conductor.

6. In combination with an electrical conductor, an electro-responsive actuating device adapted to carry current substantially proportional to current in said conductor, means for retarding said device having one form of flux distribution at predetermined values of current in said conductor and another form at other values of current whereby the speed of said actuating device is rendered substantially the same for any of said other values of current.

7. In protective apparatus of the type in which a circuit breaker is tripped after the existence of an abnormal condition for a predetermined time, an electro-responsive actuating means for said circuit breaker connectible in series therewith, means connectible in series with said circuit breaker for retarding said actuating means having one form of flux distribution at predetermined values of current through said circuit breaker and another form at other values of current whereby the speed of said actuating means is rendered substantially the same for any of said other values of current.

8. In protective apparatus of the type in which a circuit breaker is tripped after the existence of an abnormal condition for a predetermined time, an electro-responsive actuating means for said circuit breaker connectible in series therewith, means connectible in series with said circuit breaker for retarding said actuating means in such manner that its effective actuating movement is executed in times inversely proportional to the current through said circuit breaker in response to one form of flux distribution within said series connectible means and for retarding it in such manner that its effective actuating movement is executed in substantially the same time irrespective of the value of current in response to another form of flux distribution within said series connectible means.

9. In combination with an electrical conductor, an electromotive device having a movable member, means to cause said member to execute its effective movement in times substantially inversely proportional to the current in said conductor up to a predetermined value of current, and in a substantially constant time for greater values of current, comprising means for supplying flux for magnetically retarding said member and means whereby the distribution of said flux in said flux-supplying means is changed upon the occurrence of a predetermined current-flow in said conductor.

10. In combination with an electrical conductor, an electromotive device having a movable member, means to cause said member to execute its effective movement in times substantially inversely proportional to the current in said conductor up to a predetermined value of current, and in a substantially constant time for greater values of current, comprising means for supplying flux for magnetically retarding said member, said flux being produced by magnetomotive force one of the components of which is substantially constant, and the other of which is substantially zero for values of current in said conductor below a predetermined value and increases substantially in proportion to the current for values above said predetermined value.

In testimony whereof, the signature of the inventor is affixed hereto.

GEORGE M. ALBRECHT.